(12) United States Patent
Vandervoort et al.

(10) Patent No.: US 8,371,344 B2
(45) Date of Patent: *Feb. 12, 2013

(54) ADJUSTABLE REFILLING ASSEMBLY

(75) Inventors: Doug Vandervoort, Novi, MI (US);
Grant A. Compton, Livonia, MI (US);
Stanley Jay Novak, Brownstown, MI (US); Brenda Johnson, Allen Park, MI (US); Kirk Rasmussen, White Lake, MI (US); Marius Efstate, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,655

(22) Filed: May 1, 2012

(65) Prior Publication Data

US 2012/0217239 A1     Aug. 30, 2012

Related U.S. Application Data

(63) Continuation of application No. 12/176,015, filed on Jul. 18, 2008, now Pat. No. 8,167,009.

(51) Int. Cl.
*B60K 15/04* (2006.01)

(52) U.S. Cl. ......... 141/349; 141/365; 141/371; 123/1 A; 220/86.2

(58) Field of Classification Search .......... 141/348–350, 141/363, 365, 369–372; 123/1 A; 220/86.1–86.2
See application file for complete search history.

(56) References Cited

U.S. PATENT DOCUMENTS

| | | | |
|---|---|---|---|
| 2,210,536 A | | 8/1940 | Hans |
| 5,385,178 A | | 1/1995 | Bedi |
| 5,732,842 A | * | 3/1998 | Krause et al. ................ 220/86.2 |
| 5,848,626 A | | 12/1998 | Kim |
| 5,971,017 A | | 10/1999 | Kinoshita et al. |
| 6,216,755 B1 | | 4/2001 | Neufert |
| 6,263,924 B1 | | 7/2001 | Grosser |
| 6,681,811 B2 | | 1/2004 | Channing |
| 7,147,019 B2 | * | 12/2006 | Walkowski et al. .......... 141/350 |
| 7,165,583 B1 | * | 1/2007 | Walkowski et al. .......... 141/350 |
| 7,578,321 B2 | | 8/2009 | Levin |
| 7,644,740 B2 | * | 1/2010 | Benjey et al. ................ 141/350 |
| 7,866,357 B2 | | 1/2011 | Compere et al. |
| 8,167,009 B2 | * | 5/2012 | Vandervoort et al. ......... 141/349 |
| 2002/0170616 A1 | | 11/2002 | Channing |

FOREIGN PATENT DOCUMENTS

| | | |
|---|---|---|
| EP | 0114010 A2 | 7/1984 |
| JP | 56162226 A | 12/1981 |
| WO | 03066361 A1 | 8/2003 |

* cited by examiner

*Primary Examiner* — Gregory Huson
*Assistant Examiner* — Nicolas A Arnett
(74) *Attorney, Agent, or Firm* — Julia Voutyras; Alleman Hall McCoy Russell & Tuttle LLP

(57) ABSTRACT

A refilling system for a vehicle including a body panel having a fixed opening, an adjustable refilling assembly partially enclosed by the body panel, the adjustable refilling assembly including a first port and a second port, the adjustable refilling assembly movable between at least a first configuration in which the first port is aligned with the fixed opening and a second configuration in which the second port is aligned with the fixed opening.

16 Claims, 5 Drawing Sheets

ADJUSTABLE REFILLING ASSEMBLY

CROSS REFERENCE TO RELATED APPLICATIONS

The present application is a continuation of U.S. patent application No. 12/176,015 filed Jul. 18, 2008, the entire contents of which are incorporated herein by reference for all purposes.

BACKGROUND/SUMMARY

Vehicles having internal combustion engines may utilize different types of fluids to perform various functions, such as combustion and emission control. When two or more types of fluids are used in the vehicle, a number of refilling ports may be utilized, allowing separate storage tanks to be refilled. To reduce the cost of the vehicle and simplify the refilling procedure, refilling ports may be integrated into a single device, allowing an operator to selectively refill two or more storage tanks from a single port.

In US 2002/0170616 a refueling port is utilized to refill separate storage tanks in the vehicle. Specifically, a system and method are disclosed allowing a primary fuel and a reducing agent to be delivered to a primary fuel tank and a reductant tank, respectively, via a single port. A number of passageways, vacuum devices, and spring loaded mechanism are utilized, allowing distribution of a first and a second type of fluid to a first and a second storage tank without operator intervention. Additionally, the system allows two types of fuel to be dispensed concurrently or in succession via a single nozzle.

The inventors herein have recognized several disadvantages with the above approach. First, the above system presumes that a fuel dispensing system at a refueling station is capable of delivering a primary fuel and a reducing agent. Many re-fueling stations may not have the proper equipment to provide the concurrent reductant refilling due to limited consumer use and cost of installation. Furthermore, the aforementioned system relies on a standardized refilling system, which may or may not be adopted by independent refueling stations.

As such, in one approach, a refilling system for a vehicle including a body panel having a fixed opening, an adjustable refilling assembly partially enclosed by the body panel, the adjustable refilling assembly including a first port and a second port, the adjustable refilling assembly movable between at least a first configuration in which the first port is aligned with the fixed opening and a second configuration in which the second port is aligned with the fixed opening.

In this way, the adjustment of the refilling assembly, via movement, between the first and the second configuration allows the size of the fixed opening to be reduced or maintained, thus enabling improved body styling, decreasing the cost of manufacturing, as well as allowing the refilling system to be easily operated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure

DETAILED DESCRIPTION

Many types of fluids may be used for a variety of purposes in vehicles utilizing internal combustion engines. In one example, the vehicle may store fuel for combustion (combustion fuel) in the engine, as well as a reductant for delivery to the exhaust. The fuels may be diesel, gasoline, gasoline-alcohol blends, etc. Further, the reductant may be urea, ammonia, water, or a fuel blend different from that stored in the combustion fuel tank.

To enable efficient refilling of the combustion fuel and reductant, a reductant filling system may be provided which is configured to deliver two types of fluids to at least two storage tanks, both using a common access in the vehicle body. In this way, the cost of the refilling system can be reduced and the operator can easily and efficiently refill one or both storage tanks in the vehicle. Further, the access in the vehicle body can be maintained at a reduced size to enable improved styling, vehicle manufacture, etc.

Figure 1:
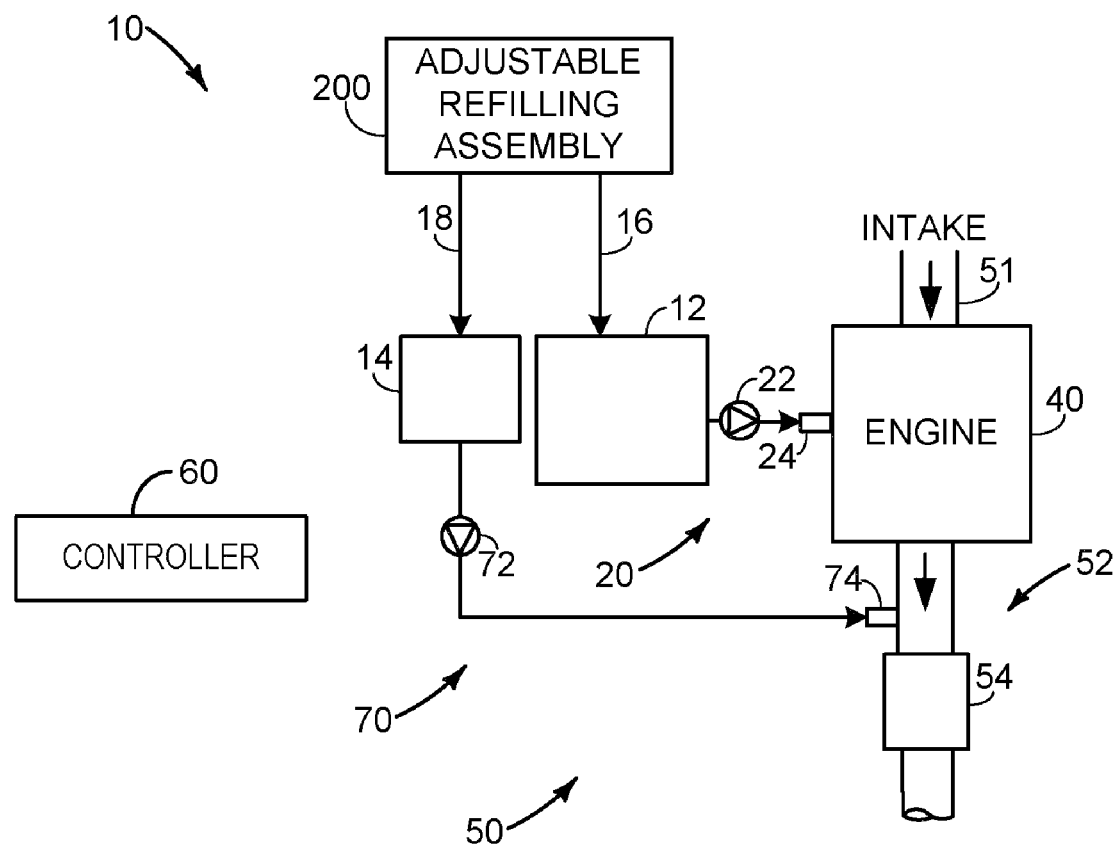
FIG. 1 shows a schematic depiction of a refilling system, a fuel delivery system, and an emission control system for an engine of a vehicle.

FIG. 1 shows an exemplary schematic depiction of a refilling system 10 including an adjustable refilling assembly 200 configured to deliver fuel to a first storage tank 12 (e.g. fuel tank) and a second storage tank 14 (e.g. reductant tank). The refilling system 10 may further include a fuel delivery system 20 configured to delivery fuel to an engine 40, and an emission control system 50 configured to reduce exhaust emissions from the engine. The engine may have an intake 51 and exhaust stream 52. It can be appreciated that the engine may include various component arranged to perform combustion, such as actuators, cylinders, valves, etc.

The refilling system may be configured to selectively route a fluid to the first storage tank via a first conduit 16 and the second storage tank via second conduit 18. In this example, the first storage tank may hold a variety of fuels for combustion in the engine, such as diesel, gasoline, ethanol, ethanol blends, biodiesel, etc. Further, the second storage tank may hold a reductant such as urea, ammonia, water, or a combination thereof. In some examples the first storage tank may be proximate to the second storage tank. Additionally, the first storage tank may have a larger volume than the second storage tank.

Fuel delivery system 20 may be configured to deliver fuel to the engine. The fuel delivery system may include the first storage tank (e.g. the combustion fuel tank) fluidly coupled to a fuel filter (not shown) and one or more fuel pumps 22 for pressurization of the fuel. The fuel delivery system may deliver pressurized fuel to cylinder in the engine from the injectors of the engine 40, such as the example injector 24 shown. While only a single injector 24 is shown, additional injectors are provided for each cylinder. In this way a predetermined amount of fuel, proportional to a fuel pulse width FPW may be delivered to various cylinders in the engine via the fuel delivery system. A controller 60 may be used to control the injection timing and FPW. It can be appreciated that fuel delivery system 20 may be a returnless fuel system, return fuel system, or various other types of fuel system.

The emission control system may include the exhaust stream 52 fluidly coupled to one or more emission control devices 54 configured to reduce emission from the vehicle. One or more emission control devices may include a three way catalyst, lean NOx trap, diesel particulate filter, oxidation catalyst, or combinations thereof.

Continuing with FIG. 1, the emission control system may include a reductant delivery system 70 configured to deliver reductant to the exhaust stream. The reductant delivery system may include the second storage tank (e.g. reductant tank), a reductant pump 72 fluidly coupled the second storage tank, and a reductant injector 74 fluidly coupled to the reductant pump and the exhaust stream. In this example, the reductant injector is coupled upstream of an emission control device. However, in alternate examples the injector may be coupled to another suitable location, such as directly to the emission control device, or between various emission control devices. Further, multiple exhaust injectors may be used to deliver reductant to various locations in the exhaust.

Controller 60 may be electronically coupled to the fuel pump, fuel injector(s), reductant pump and reductant injector(s). In this way, the timing and pulse width of the reductant injection and the fuel injection may be adjusted. In particular the fuel injector may inject fuel into the cylinders to perform compression ignition and the reductant injector may inject a reductant into the exhaust stream to perform selective catalytic reduction. In other examples, spark ignition may be performed in the engine. Additionally, the controller may be coupled to a variety of sensor capable of determining air fuel ratio, throttle position, engine temperature, emission control device temperature, etc. The injection timing and pulse width of both the fuel and the reductant injector(s) may be adjusted in response to signals produced by the aforementioned sensors.

Figure 3A:
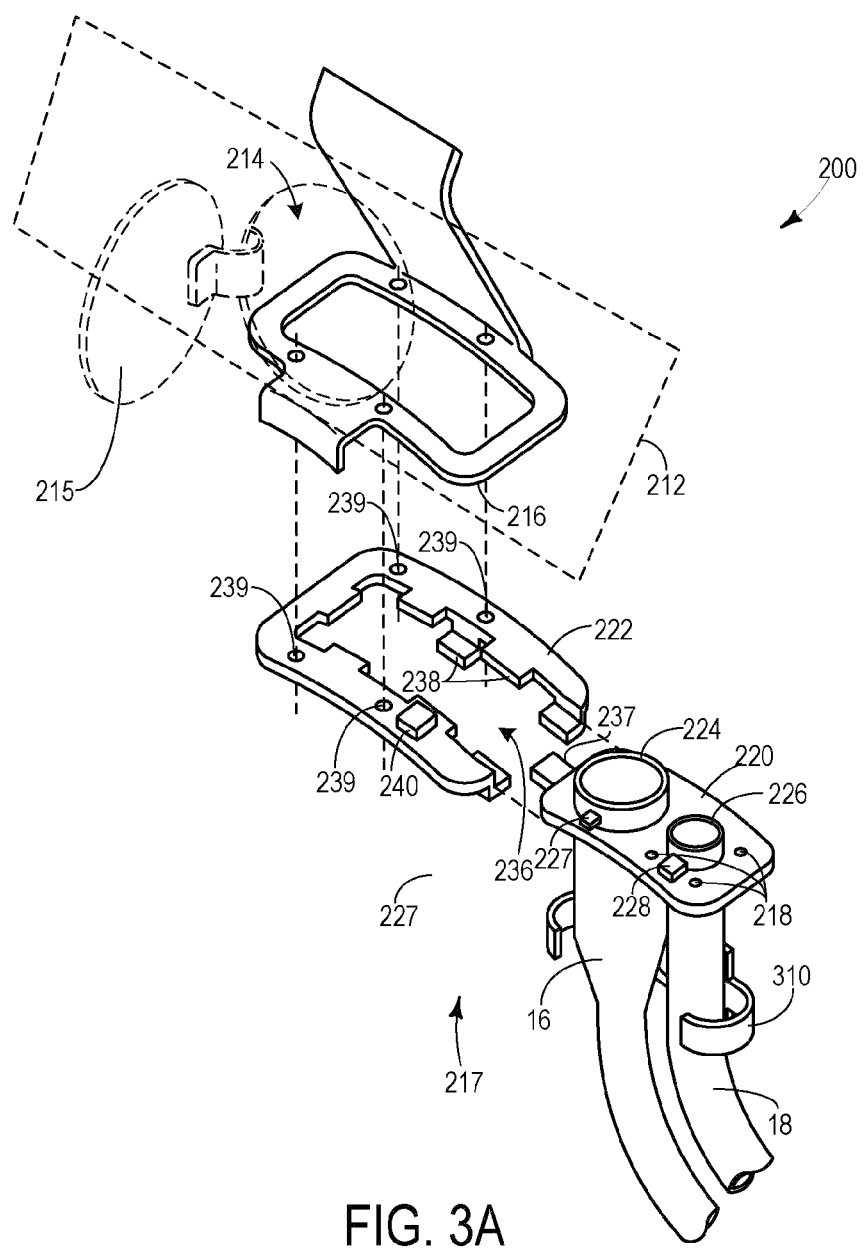
FIG. 3A shows a second embodiment of an adjustable refilling assembly.
Figure 3B:
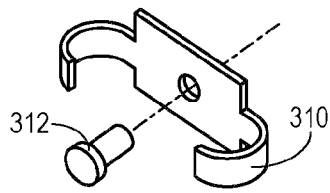
FIG. 3B shows a pivot and clasp included in the adjustable refilling assembly shown in FIG. 3A.
Figure 4:
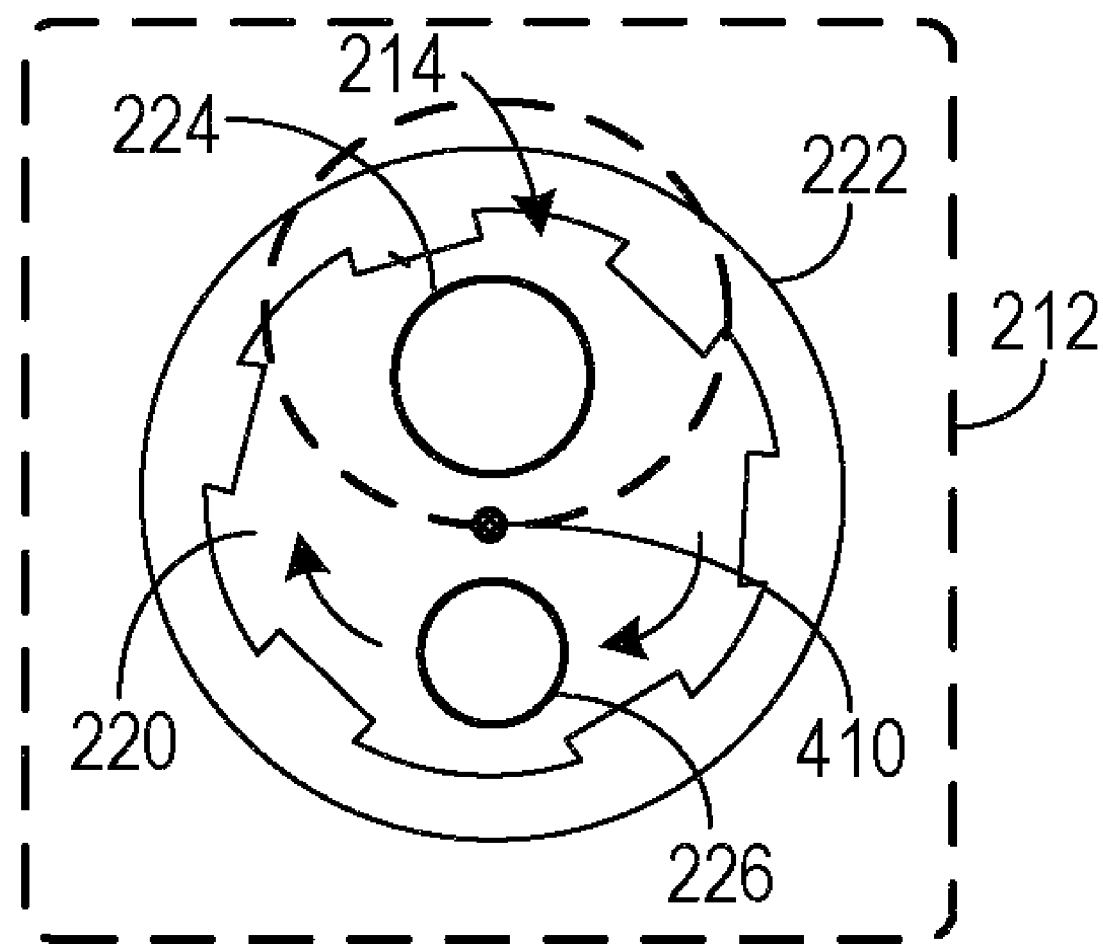
FIG. 4 shows a top view of a third embodiment of an adjustable refilling assembly.

The refilling system may include an adjustable refilling assembly, such as the various examples shown in FIGS. 2-4, having at least two configurations. In the first configuration, the adjustable refilling assembly may be positioned, via manual or other adjustment, to enable refilling of the fuel tank. In the second configuration the adjustable refilling assembly may be positioned to enable refilling of the reductant tank. In some examples, the adjustable refilling assembly may be reconfigured via manual actuation, or automatically positioned, as described below.

Figures 2A, 2B:
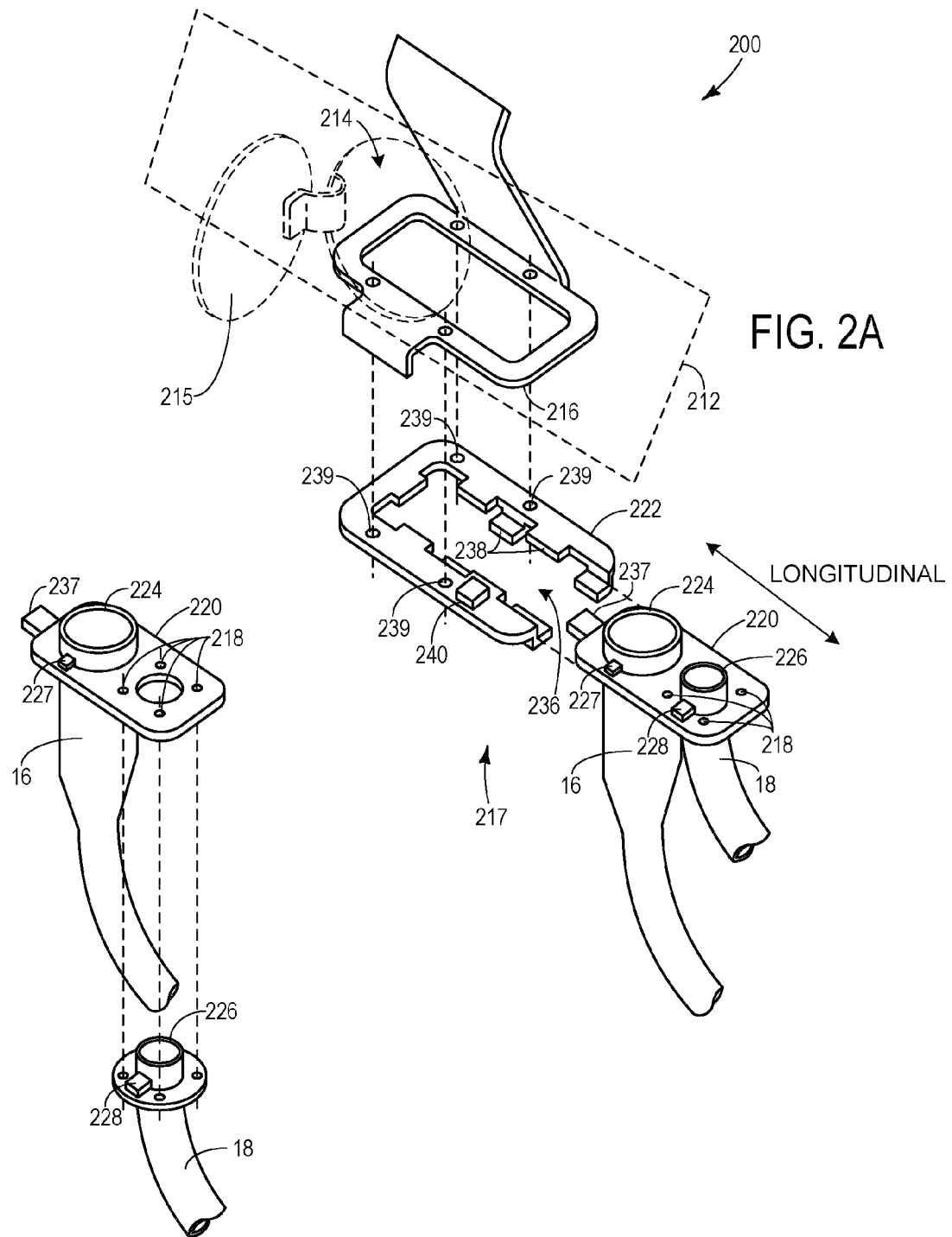
FIG. 2A shows a first embodiment of an adjustable refilling assembly.
FIG. 2B shows an illustration of a slide included in the adjustable refilling system of FIG. 2A.
Figure 2C:
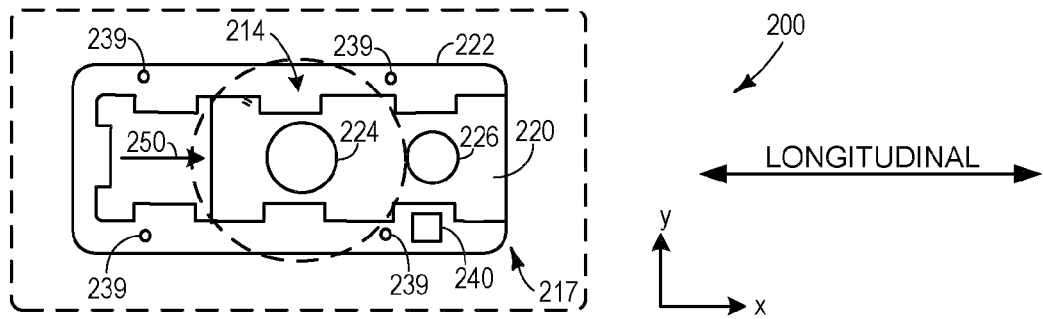
FIG. 2C shows a top view of a first configuration of the adjustable refilling assembly, shown in FIG. 2A.
Figure 2D:
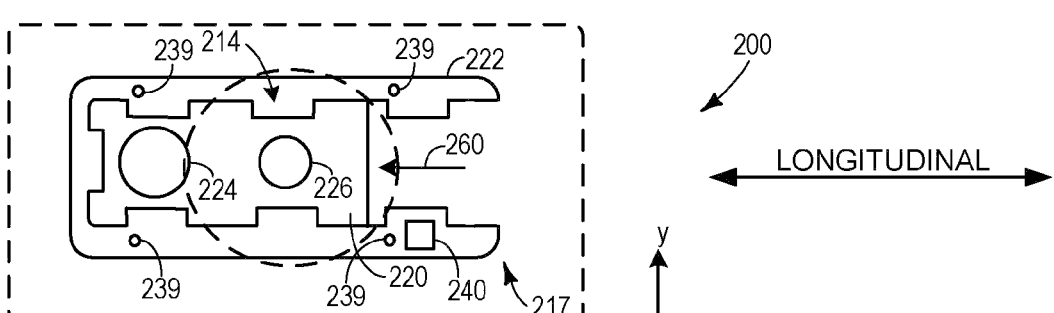
FIG. 2D show a top view of a second configuration of the adjustable refilling assembly, shown in FIG. 2A.
Figure 2E:
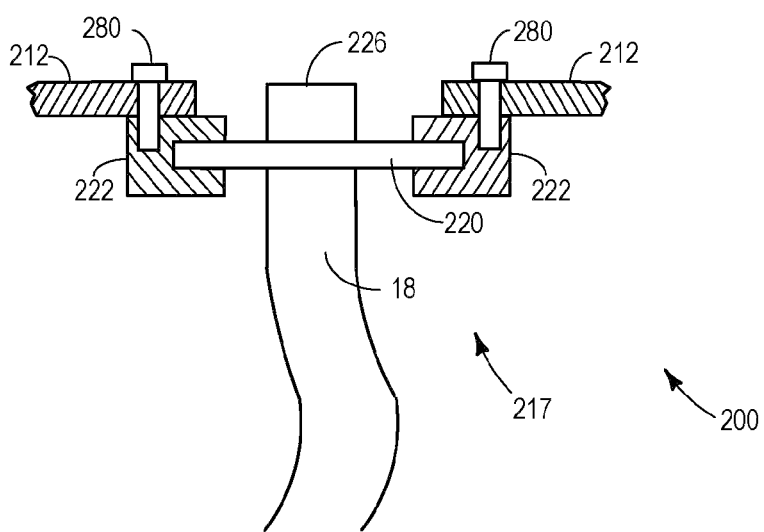
FIG. 2E show a side view of the adjustable refilling assembly shown in FIG. 2A.

FIGS. 2-4 show various embodiments of an adjustable refilling assembly 200. The adjustable refilling assembly allows multiple storage tanks in the vehicle to be selectively refilled via multiple refilling ports based on the configuration of the assembly. Specifically, FIG. 2A and FIG. 3A show detailed embodiments of the adjustable refilling assembly. FIG. 2C and FIG. 2D show the first and the second configuration of the adjustable refilling assembly.

Referring now to FIG. 2A, it shows a first embodiment of the adjustable refilling assembly. In this embodiment, the adjustable refilling assembly is arranged in what is referred to as a flat configuration. In other embodiments, such as shown in FIG. 3A, the assembly may be arranged in alternative configurations, such as what is referred to as a curved configuration.

The adjustable refilling assembly is shown partially enclosed by a body panel 212 having a fixed opening 214. In this example, the fixed opening is circular and symmetric. However, in other examples, the fixed opening may be oval, asymmetric, rectangular, etc.

An adjustable fuel door 215 may be coupled to the body panel, allowing the fixed opening to be covered and uncovered. The adjustable refilling assembly may include an overlay 216 which may be configured to be attached to the body panel or other suitable component of the vehicle. The adjustable refilling assembly further includes an adjustment mechanism 217 allowing the assembly to be adjusted into a first and a second configuration. The adjustment mechanism may be coupled to the overlay via bolts or other suitable attachment mechanisms.

Continuing with FIG. 2A, the adjustment mechanism may include a slide 220 and a slide acceptor 222. The slide may be rectangular shaped and flat and sized to be directed into the slide acceptor, which may also be flat. Additionally, the slide may include a first port 224 (e.g. combustion fuel port) and a second port 226 (e.g. reductant port) coupled to a first conduit (e.g. combustion fuel conduit) and a second conduit (e.g. reductant conduit), 16 and 18, respectively. In some embodiments, the first port and the second port may be constructed to be different in material, shape, size texture, and/or color, enabling the operator to easily distinguish the ports and physically preventing an incorrect fluid from being dispensed into the first and second ports. The first port may include a fuel indicia 227 identifying the acceptance of a fuel, such as the indicia "DIESEL". Furthermore, the second port may include a reductant indicia 228, identifying the acceptance of a reductant, such as the indicia "UREA". It can be appreciated that in other examples the indicia may identify alternate types of fluids which may be delivered to the storage tanks. The fuel conduit and the reductant conduit may be coupled to the fuel tank and reductant tank, respectively, shown in FIG. 1. Furthermore, the conduits may be flexible allowing the slide to be adjusted. In this example, the second port may be configured to be fastened to the slide via bolts, as shown in FIG. 2B. In other examples both ports may be configured to be fastened to the slide via bolt cavities 218. Yet in other examples both ports may be configured to snap and lock into slide 220.

Continuing with FIG. 2A, the slide acceptor may include a channel 236 configured to accept the slide. Movement of the slide in the slide acceptor may generate haptic feedback allowing the operator to identify the configuration of the adjustable refilling assembly. For example, a resistance mechanism 237, which may be a spring, may be coupled directly to the slide and/or slide acceptor. When a longitudinal force is applied to the slide in the first configuration, the resistance mechanism may apply an opposing force. In this way, the first configuration (e.g. fuel position) is adjustment mechanism's default configuration. The default configuration may be selected based on the frequency of use of the port. For example, the first configuration may have a higher frequency of use, therefore the first configuration may be set as the default configuration. The slide acceptor may further include teeth 238 spaced apart to decrease the weight and cost of the assembly while retaining the ability to structurally support the slide. In some examples, the slide acceptor may be constructed of a metal such as steel, polymeric material, and/or other suitable materials. Additionally, the slide acceptor may be configured to attach to the overlay via overlay bolt cavities 239.

Furthermore, the adjustable refilling assembly may be locked into the first and second configurations via a locking mechanism 240. The locking mechanism may include a pin (not shown), which may be spring loaded, or a latch (not shown). The spring loaded pin may be withdrawn from the assembly allowing the slide to be moved while the latch may be lifted to allow movement of the slide. In this way, a locking mechanism may be unlocked, allowing the assembly to be adjusted into a first or a second configuration. On the other hand, when the pin is inserted or the latch is fastened, the slide may be locked, thereby inhibiting movement. In some examples, when the resistance mechanism is utilized, the locking mechanism may lock the adjustable refilling assembly in only the second configuration. Thus, when the locking mechanism is unlocked, the assembly is adjusted into the first configuration. It can be appreciated that alternate configurations of the locking mechanism and resistance mechanism may be employed. For example, the locking mechanism may lock the assembly in the first configuration, and in response to unlocking, the assembly may be adjusted into the second configuration. The locking mechanism may be constructed out of plastic, metal, or other suitable material.

Additionally, a reset mechanism (not shown) may be coupled the fuel door 215. The reset mechanism may be a mechanical component which may adjust the refilling assembly into the first or second configuration in response to movement of the fuel door. In one example, when the fuel door is closed, the reset mechanism may reset the adjustment mechanism into the first configuration (e.g. default configuration) via actuation of the locking mechanism by the fuel door.

As noted above, the adjustable refilling assembly may be mounted to a vehicle, allowing the operator to easily access the different storage tanks from single location, without requiring an excessively large body opening.

A top view of the adjustable refilling assembly of FIG. 2A positioned in a first configuration is illustrated in FIG. 2C. As illustrated, the adjustable refilling assembly may be reconfigured via a longitudinal force 250, which may be initiated by the operator of the adjustable refilling assembly. In the first configuration the first port (e.g. combustion fuel port) may align with the fixed opening (viewable through the fixed opening). Alignment may include vertical alignment of the refilling port with the fixed opening, where the vertical direction is perpendicular to the x-y plane of the slide and/or slide acceptor. In this way, a nozzle may be inserted into the fuel port for refueling. Furthermore, the fixed opening may not be aligned with the second port. In this way, the body panel may inhibit refilling of the reductant port.

Additionally, as shown in FIG. 2C, the fuel port may be larger than the reductant port. In this way, the operator of the device is capable of differentiating between the refilling ports. Other distinguishing characteristics may also be used to differentiate between the first and the second ports such as material, shape, texture, indicia, and/or color.

A second configuration of the adjustable refilling assembly of FIG. 2A is shown in FIG. 2D. Similar components are labeled accordingly. The adjustable refilling assembly may be reconfigured via a longitudinal force 260, which may be initiated by the operator. In other examples, the longitudinal force may be delivered by a device such as a latch, button, lever, or other suitable component capable of applying a longitudinal force to the slide, and which may be actuated by the fuel door, or other device. In the second configuration, the second port (e.g. reductant port) may be aligned with the fixed opening. The first port may be enclosed by the body panel, inhibiting insertion of a nozzle (e.g., inhibiting refilling) into the fuel port. In this way, the second port can be refilled while refilling of the first port is inhibited.

FIG. 2E show a side view of the adjustable refilling assembly, shown in 2A. In this example, the slide has been inserted into the slide acceptor. Further, in this example the adjustable refilling assembly is coupled to the vehicle via attachment devices 280.

FIG. 3A shows a second embodiment of the adjustable refilling assembly. The second embodiment is similar in construction to the first embodiment, with similar parts labeled accordingly. However, one distinction between the first and second embodiments of the adjustable refilling assembly is the curvature of the latter assembly. The curvature allows adjustment of the slide while reducing the chance of bending, part-to-part interference, and/or obstruction of the fuel and/or the reductant conduits. The slide and slide acceptor may be curved and have a common radius of curvature.

The embodiment of FIG. 3A may include a clasp 310. The clasp is configured to hold both of the conduits in place during actuation of the adjustment mechanism, decreasing the potential of damage to the conduits. A pin 312 may be pivotably coupled to the clasp, as shown in FIG. 3B. Furthermore, the clasp and/or pin may be positioned proximate to the center of the circle defined by the curvature of the slide and/or slide acceptor.

In this way, the movement of the conduits during reconfiguration (i.e. actuation) may be decreased.

FIG. 4 shows a top view of the third embodiment of the adjustable refilling assembly. Similar components are labeled accordingly. In this embodiment the slide and slide acceptor are substantially circular in shape. In this way, rotation may be used to actuate the adjustable refilling assembly. The slide may rotate about a pivot point 410.

It will be appreciated that the configurations and routines disclosed herein are exemplary in nature, and that these specific embodiments are not to be considered in a limiting sense, because numerous variations are possible. For example, the above technology can be applied to left hand side and/or right hand side refilling systems. Furthermore, the above approach can be applied to land or water vehicles, and can be applied to various fluids such as those noted herein, as well as oils, other fuels, etc. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A vehicle refilling system, comprising:
a body panel having a fixed opening;
an adjustable refilling assembly partially enclosed by the body panel and including: a first port, a second port, and an adjustment mechanism having a rotatable slide; the adjustable refilling assembly movable between at least a first configuration where the first port is aligned with the fixed opening and a second configuration where the second port is aligned with the fixed opening.

2. The refilling system of claim 1 wherein the first configuration inhibits refilling of the second port and the second configuration inhibits refilling of the first port.

3. The refilling system of claim 1 wherein the first and second ports are constructed with a different property.

4. The refilling system of claim 3 wherein the different property includes a different shape.

5. The refilling system of claim 3 wherein the different property includes a different size.

6. The refilling system of claim 3 wherein the first port includes indicia identifying acceptance of diesel fuel and the second port includes indicia identifying acceptance of a reductant.

7. The refilling system of claim 1 wherein the second port is fluidly coupled to a reductant delivery system configured to deliver reductant to an exhaust of the vehicle.

8. The refilling system of claim 1 further comprising a first flexible conduit coupled to the first port, and a second flexible conduit coupled to the second port.

9. The refilling system of claim 8 wherein the adjustable refilling assembly is curved and further includes a clasp coupled to the first and second flexible conduits.

10. The refilling system of claim 9 wherein a pivot is coupled to the clasp.

11. The refilling system of claim 1 wherein the adjustable refilling assembly is adjusted into the first and second configurations via a rotation movement of the slide.

12. The refilling system of claim 1 wherein the adjustment mechanism includes a locking mechanism configured to lock the adjustable refilling assembly in one of the first and second configurations.

13. The refilling system of claim 12 further comprising a resistance mechanism coupled to the slide, the resistance mechanism configured to apply a force opposing movement of the adjustment mechanism while in the first configuration.

14. The refilling system of claim 1 wherein the fixed opening includes a door.

15. A refilling system for an internal combustion engine of a vehicle comprising:
 a body panel having a fixed opening; and
 an adjustable refilling assembly partially enclosed by the body panel, the adjustable refilling assembly including a moveable adjustment mechanism having a fuel port fluidly coupled to a fuel tank and a reductant port fluidly coupled to a reductant tank;
 wherein the adjustable refilling assembly has a first configuration in which the fuel port is aligned with the fixed opening, and a second configuration in which the reductant port is aligned with the fixed opening, the moveable adjustment mechanism having a rotatable slide; and
 a fuel door in the fixed opening.

16. A refilling system for an internal combustion engine of a vehicle comprising:
 a body panel having a fixed opening; and
 an adjustable refilling assembly partially enclosed by the body panel, the adjustable refilling assembly including a moveable adjustment mechanism having a fuel port fluidly coupled a fuel tank and a reductant port fluidly coupled to a reductant tank;
 wherein the adjustable refilling assembly has a first configuration in which the fuel port is aligned with the fixed opening, and a second configuration in which the reductant port is aligned with the fixed opening, the moveable adjustment mechanism having a rotatable slide; and
 a fuel door in the fixed opening, wherein the engine includes an exhaust with an emission control device, the vehicle further including a reductant delivery system coupled to the reductant tank and including a reductant injector coupled in the exhaust.

* * * * *